Dec. 11, 1923.

M. W. BARTMESS 1,476,790

CENTRIFUGALLY OPERATED CIRCUIT CONTROLLING DEVICE

Filed Feb. 18, 1922

Inventor:
Meige W. Bartmess
by
Thurston Kwis & Hudson
attys

Patented Dec. 11, 1923.

1,476,790

UNITED STATES PATENT OFFICE.

MEIGS W. BARTMESS, OF CLEVELAND, OHIO, ASSIGNOR TO THE NATIONAL SCREW AND MANUFACTURING COMPANY, OF CLEVELAND, OHIO, A CORPORATION OF OHIO.

CENTRIFUGALLY-OPERATED CIRCUIT-CONTROLLING DEVICE.

Application filed February 18, 1922. Serial No. 537,454.

*To all whom it may concern:*

Be it known that I, MEIGS W. BARTMESS, a citizen of the United States, residing at Cleveland, in the county of Cuyahoga and State of Ohio, have invented a certain new and useful Improvement in Centrifugally-Operated Circuit-Controlling Devices, of which the following is a full, clear, and exact description.

This invention relates to a centrifugally operated circuit controlling device adapted particularly for alternating current motors such, for example, as repulsion induction motors which start as repulsion motors and then run as induction motors, in which event my invention is utilized to short circuit the commutator bars to which the rotor coils are connected.

The invention may be utilized advantageously with other types of motors and with other electrical apparatus wherein a circuit is automatically closed or opened as the case may be when the device embodying my invention is moved outwardly or expanded by centrifugal force.

The principal object of the invention is to provide a centrifugally operated circuit controlling device which is inexpensive, compact, and possesses to a high degree the features of efficiency and durability.

The circuit controlling device embodying my invention comprises an expansible and contractible member in the form of a ring or annulus, this member being formed of conducting material and containing a plurality of weights, preferably in the form of balls which are disconnected and independent of each other and preferably substantially fill the annulus when the latter is in its contracted position, but which move outwardly so as to enlarge or spread the annulus so that the circuit controlling function can be brought about.

The invention may be further briefly summarized as consisting in certain novel details of construction, and combinations and arrangements of parts which will be described in the specification and set forth in the appended claims.

Figure 1:
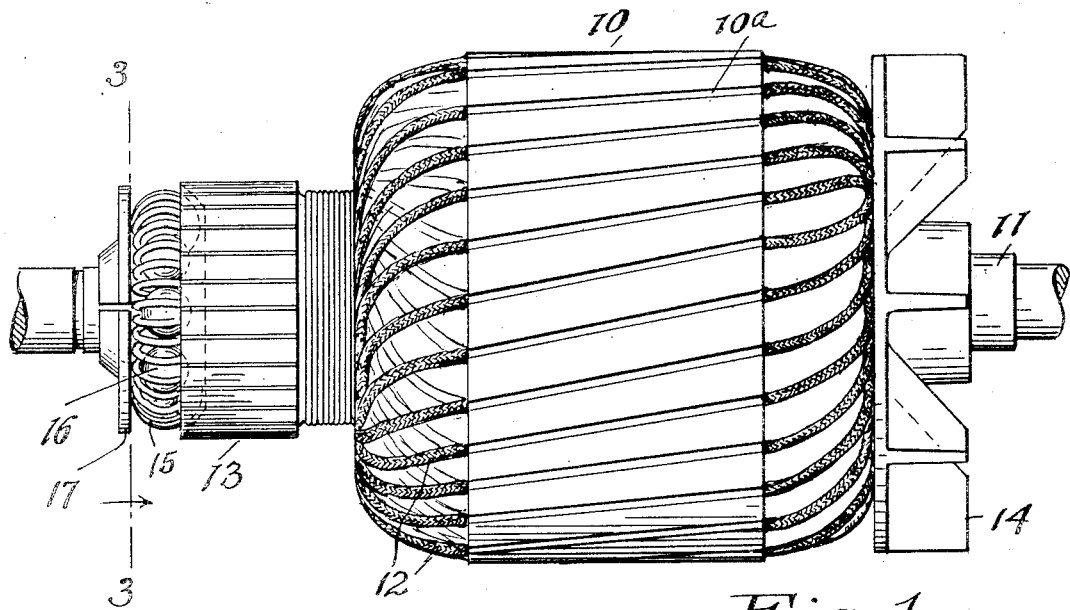
Figure 2:
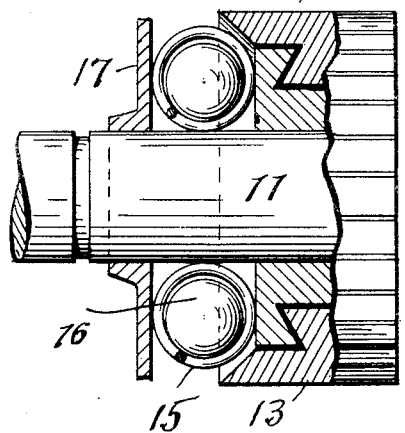
Figure 3:
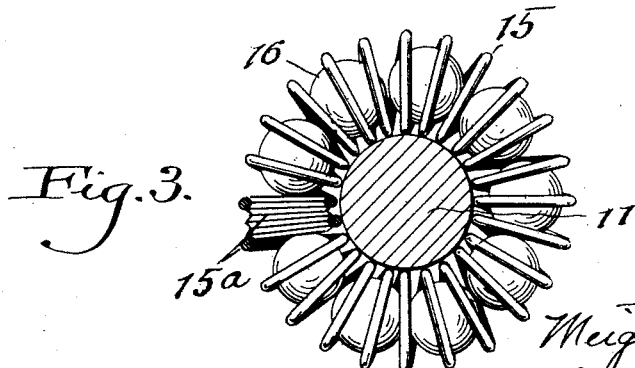

In the accompanying sheet of drawings wherein I have shown my invention applied to the rotor of a motor of the repulsion induction type with which the circuit controlling device is utilized in this instance to short circuit the commutator bars when the rotor has attained a given speed, Fig. 1 is an elevation of the rotor equipped with my invention; Fig. 2 is a sectional view on an enlarged scale through the commutator and short circuiting device; and Fig. 3 is a transverse sectional view substantially along the line 3—3 of Fig. 1.

Referring now to the drawings, 10 represents the rotor core mounted on shaft 11, and provided with slots 10ª containing the usual rotor coils 12 connected to the bars of the commutator 13. In this instance I have shown at one end of the rotor a fan 14 for cooling purposes, but this forms no part of the present invention.

As is well known, a motor of this type starts as a repulsion motor when the stator is energized, at which time the commutator bars are externally electrically disconnected from each other, and the commutator is engaged by properly located brushes. But when the motor reaches a predetermined speed the bars are short circuited so as to obtain a short circuited secondary to enable the motor to run as an induction motor.

When applied to a motor of this kind my invention is utilized to short circuit the bars of the commutator when the speed is such that centrifugal force causes the expansion of the annulus so as to move it outwardly and engage the commutator bars.

Taking up now the details of the circuit controlling device, it will be observed that it includes an annulus in the form of a helical spring 15, preferably formed of good conducting material such as phosphor bronze. The ends of the spring may be connected together by any suitable spring connector 15ª. Inside the annulus I provide a series of balls 16 which practically fill the annulus when the latter is contracted. That is to say, a sufficient number of balls are provided so that when the spring is contracted they are contiguous to one another, and preferably the size of the balls is such that they are only slightly smaller than the internal diameter of the annulus when it is contracted. Standard steel bearing balls may be used for this purpose, or the balls may be formed of any other suitable material having the proper mass.

The circuit controlling device including the helical annulus and the balls contained therein may be arranged in various ways with respect to the commutator bars, but in this instance it is arranged at the end of the commutator between the latter and a retainer 17, which in this instance is in the form of a split disk with a flange forming a hublike portion which is sprung onto the shaft 11. For small motors the hub of the retainer is spread somewhat and slipped to proper position on the shaft, and when released it automatically grips the shaft and is thus held in position. If necessary, other means such as a set screw or nut may be utilized to position the retainer.

It is generally desirable that either the retainer or the portions of the commutator bars which are designed to be engaged by the short circuiting device when it expands, be tapered so as to produce a wedging action and force the helical spring firmly against the commutator bars, and while either the retainer or bars may be tapered, in this instance the retainer 17 has a flat vertical face which is presented to the helix, and the bars are tapered. The further effect of this tapering is to form a constriction in the outer part of the space between the retainer and the commutator so as to limit the travel of the short circuiting device in an outward direction under the action of centrifugal force.

When the rotor is stationary, the short circuiting device occupies the position shown in Figs. 2 and 3, with the annular helical spring housed between the commutator and the retainer, and contracted so as to hug that part of the rotor shaft which it surrounds, with the spring located inside of and at a predetermined distance from the partially overhanging or tapered ends of the commutator bars.

Assuming that the commutator is engaged by brushes, not shown, the motor will start as a repulsion motor when the stator is energized, and as the rotor reaches a certain predetermined speed the annular helical spring is expanded by the action of centrifugal force on the spring and balls, but particularly on the balls, and engages the bars and is wedged against them so as to very effectively short circuit the bars, and when this occurs the motor runs as an induction motor. When the motor is stopped, the device automatically contracts and again assumes its normal position shown in the drawings, with the commutator bars externally disconnected from one another.

The tension of the spring resists expansion until just before the rotor reaches the speed at which the short circuiting takes place, making it unnecessary that the spring when contracted be spaced any considerable distance from the bars. The speed at which short circuiting occurs depends, of course, on the mass of the spring and balls and the normal tension of the spring.

The helical spring has a sufficient number of turns or convolutions and they are spaced sufficiently close together that when the spring is expanded and short circuits the bars, each bar is engaged by one or more convolutions, as will be desirable to obtain the highest efficiency.

My invention has proven by extensive usage to be very efficient when utilized in the particular type of motor or electrical apparatus herein described, but as before stated, it may be utilized with other types of apparatus, and particularly other types of alternating current motors wherein the circuit is to be closed or opened when a certain speed is reached, the chief characteristic or feature of the invention being an expansible annulus preferably in the form of a helical spring, and preferably of good conducting material and enclosing a series of independent or unconnected weights preferably balls arranged as, or substantially as shown.

Having described my invention, I claim:

1. A circuit controlling device for electrical apparatus such as alternating current motors, comprising an expansible annulus containing a plurality of separate and independent free weights adapted to expand the annulus and to be restrained thereby.

2. A short circuiting device for electrical apparatus, comprising an expansible annulus in the form of a helical spring containing a plurality of independent disconnected loose weights.

3. A circuit controlling device for electrical apparatus, comprising an expansible and contractible annulus of conducting material and in the form of a helical spring containing a plurality of independent loose balls.

4. A short circuiting device for electrical apparatus, comprising an expansible and contractible annulus in the form of a helical spring of conducting material and substantially filled when contracted with a series of free and disconnected weights.

5. A circuit controlling device having parts adapted to be short circuited, and having a retainer arranged adjacent thereto, and a centrifugally operated controlling device arranged between said parts and the retainer, and comprising an expansible and contractible annulus of conducting material containing a plurality of weights disconnected from each other and from the annulus.

6. A circuit controlling device comprising a rotor having parts adapted to be short circuited, a retainer adjacent thereto, and a short circuiting device arranged between said parts and the retainer and comprising an expansible and contractible annulus in the form of a helical spring of conducting material and containing a plurality of weights disconnected from each other and the annulus.

7. A circuit controlling device comprising, a shaft having a rotor core provided with conductors, a commutator to which the conductors are connected, a retainer arranged adjacent the commutator, forming therewith a housing or space for a short circuiting device, and a short circuiting device in said space and comprising an expansible and contractible annulus in the form of a helical spring of conducting material, and a series of loose unconnected weights arranged in said annulus and adapted to spread said annulus and to force it against the bars of the commutator.

8. A controlling device comprising a shaft, a core having conductors, a commutator having bars to which the conductors are connected, said bars having outer overhanging portions, a retainer arranged opposite the commutator, a short circuiting device between the retainer and the commutator, and comprising an annulus in the form of a helical spring of conducting material, and a series of loose balls inside said spring and adapted by the action of centrifugal force when the motor is in operation to force the spring out against the overhanging portions of the bars so as to short circuit the same.

In testimony whereof, I hereunto affix my signature.

MEIGS W. BARTMESS.